US012680893B2

(12) United States Patent
Vergauwen et al.

(10) Patent No.: US 12,680,893 B2
(45) Date of Patent: Jul. 14, 2026

(54) SENSOR CONFIGURATION

(71) Applicant: Melexis Technologies NV, Tessenderlo (BE)

(72) Inventors: Johan Vergauwen, Tessenderlo (BE); Peter Vandersteegen, Tessenderlo (BE); Appo Van Der Wiel, Tessenderlo (BE); Ben Maes, Tessenderlo (BE)

(73) Assignee: MELEXIS TECHNOLOGIES NV, Tessenderlo (BE)

( * ) Notice: Subject to any disclaimer, the term of this patent is extended or adjusted under 35 U.S.C. 154(b) by 338 days.

(21) Appl. No.: 18/587,283

(22) Filed: Feb. 26, 2024

(65) Prior Publication Data

US 2024/0288323 A1 Aug. 29, 2024

(30) Foreign Application Priority Data

Feb. 27, 2023 (EP) ..................................... 23158903

(51) Int. Cl.
G01L 1/22 (2006.01)
G01L 1/16 (2006.01)
(52) U.S. Cl.
CPC .............. G01L 1/2268 (2013.01); G01L 1/16 (2013.01); G01L 1/225 (2013.01)
(58) Field of Classification Search
CPC .......... G01L 1/2268; G01L 1/16; G01L 1/225
See application file for complete search history.

(56) References Cited

U.S. PATENT DOCUMENTS

| | | | |
|---|---|---|---|
| 6,040,779 A | 3/2000 | Pfaff et al. | |
| 7,278,319 B2 * | 10/2007 | Johnson | .................. G01L 9/065 |
| | | | 73/727 |
| 7,823,456 B2 | 11/2010 | Krog et al. | |
| 2001/0008478 A1 | 7/2001 | McIntosh et al. | |
| 2019/0078953 A1 | 3/2019 | Huo et al. | |
| 2022/0136915 A1 * | 5/2022 | Vergauwen | ............... G01L 9/04 |

FOREIGN PATENT DOCUMENTS

EP          0925512 A1      6/1999

OTHER PUBLICATIONS

Extended European Search Report from corresponding EP Application No. 23158903.7, Oct. 2, 2023.

* cited by examiner

*Primary Examiner* — Kristina M Deherrera
*Assistant Examiner* — Jean F Morello
(74) *Attorney, Agent, or Firm* — Workman Nydegger

(57) ABSTRACT

A sensor device for measuring a physical parameter. The sensor device comprises at least three sensing elements. Each sensing element comprises a first node and a second node. The first nodes of all sensing elements are connected together, and the second nodes are accessible to a readout circuit for measuring differential signals between the second nodes. At least three of the sensing elements have a different sensitivity to the physical parameter.

15 Claims, 5 Drawing Sheets

SENSOR CONFIGURATION

FIELD OF THE INVENTION

The invention relates to the field of sensor devices. More specifically it relates to sensor devices comprising a plurality of sensing elements.

BACKGROUND OF THE INVENTION

In safety critical environments, such as automotive applications, redundancy of a sensor device is of utmost importance. Besides being redundant it is also of utmost importance that faults in the sensor device can be determined.

For functional safety it is, therefore, preferable to have more than 1 sensing element that measures the same physical parameter (e.g. pressure). These may for example be configured in a Wheatstone bridge configuration.

In typical applications an interface circuit is provided for applying a current or voltage to the sensing elements and for reading out a differential signal(s) from the sensing elements. The monitoring of the functioning of sensing elements is known in the art. EP0925512 shows an example in which a full symmetrical bridge is monitored by comparing the differential signal from the full bridge with one of the single-ended signals (generated by only halve of the bridge). In EP0925512, 4 connections are used to connect a sensor configured as a Wheatstone bridge and both middle points of the bridge are measured in a single-ended way, to get extra information so that certain sensor faults can be detected. The downside of such a configuration is that the single-ended signal is less accurate and less robust than the differential signal, due to the bigger signal that needs to be measured and the higher sensitivity to disturbances like e.g. caused by electromagnetic interference and lifetime drift.

There might be practical limitations on the number of connections between the sensor device and the interface circuit. For some applications it is for example particularly advantageous to limit the number of wires between the sensor and the interface chip. In some applications the number of connections may for example be limited to 4.

There are also practical limitations when packaging a sensor die (e.g. MEMS pressure sensor) and an interface die together in the same package. Although it might be possible to use more than 4 wires in such a case, it still has an impact on the cost and potentially also the reliability. Furthermore it might be advantageous to have different kind of sensors integrated on the same die (e.g. a pressure sensor and a temperature sensor or a stress sensor to measure packaging stress) while keeping the number of connections limited.

Adding a second Wheatstone bridge would increase the number of connections to 6 (or more if the supply and ground connection cannot be shared between the 2 bridges). Adding a half bridge (2 resistors configured as a resistive divider between supply and ground) would increase the number of connections to at least 5. Also the configuration with 4 resistors connected to a common node like described in US20190078953 needs 5 connections.

The examples above illustrate the need for redundancy and safety (in terms of faults which can be detected) and accuracy of a sensor device while keeping the number of connections with an interface circuit limited.

SUMMARY OF THE INVENTION

It is an object of embodiments of the present invention to provide good sensor devices comprising a plurality of sensing elements and good sensor systems comprising such sensor device and a readout circuit connected with the sensor device. In embodiments of the present invention the safety and/or the accuracy of the sensor devices may be increased compared to prior art sensor devices.

The above objective is accomplished by a device and system according to the present invention.

In a first aspect embodiments of the present invention relate to a sensor device for measuring a physical parameter. The sensor device comprises at least three sensing elements. Each sensing element comprises a first node and a second node. The first nodes of all sensing elements are connected together, and the second nodes are accessible to a readout circuit for measuring differential signals between the second nodes. At least three of the sensing elements have a different sensitivity to the physical parameter. In embodiments of the present invention all sensing elements have a different sensitivity to the physical parameter. In embodiments of the present invention one or more of the sensing elements are not sensitive to the physical parameter. For example in the case of 3 sensing elements only one sensing element can be not sensitive to the physical parameter. In embodiments of the present invention two of the sensing elements are not sensitive to the physical parameter. For example a sensor device in accordance with an exemplary embodiment of the present invention may comprise exactly 4 sensing elements of which 2 are not sensitive to the physical parameter.

In embodiments of the present invention the number of sensing elements is exactly three.

In embodiments of the present invention the number of sensing elements is exactly four.

In embodiments of the present invention the sensing elements are sensing resistors.

In embodiments of the present invention the resistance of at least one of the sensing resistors is increasing with increasing physical parameter and the resistance of at least one of the sensing resistors is decreasing with increasing physical parameter, thus forming a pair of sensing resistors with sensitivities with opposite sign.

In embodiments of the present invention the sensing resistors of the pair of sensing resistors with sensitivities with opposite sign have nominally the same value.

In embodiments of the present invention the sensing elements are capacitive sensors.

In embodiments of the present invention the sensor device is a semiconductor pressure sensor comprising a membrane, delineated by an edge. The sensing elements are neighboring piezo resistors. A first and a second piezo resistor are positioned near the edge of the membrane and are located such that their center points are on the membrane. A third and a fourth piezo resistor are at a position where applied pressure causes reduced surface stress compared to surface stress at the position of the first and the second piezo resistor. The first and the third piezo resistor are substantially orthogonal to the second and the fourth piezo resistor.

In a second aspect embodiments of the present invention relate to a sensor system comprising a sensor device and a readout circuit. The readout circuit is connected to the second node of each sensing element.

The readout circuit is configured for:

applying driving signals to the second nodes of the sensing elements, and for reading differential signals between different pairs of the second nodes, and for calibrating the differential signals taking into account the sensitivities of the sensing elements, and comparing the calibrated differential signals for determining correct functionality of the sensor system.

In embodiments of the present invention the readout circuit comprises at least two current sources for injecting a current in the sensing elements as driving signal.

In embodiments of the present invention the differential signals are differential voltages.

In embodiments of the present invention the readout circuitry comprises at least one signal path for processing the differential signals.

In embodiments of the present invention the at least one signal path comprises an amplifier.

In embodiments of the present invention the number of sensing elements is at least 4, and the readout circuit is configured for determining which differential signals are correct, by comparing the calibrated differential signals.

In embodiments of the present invention the physical parameter is pressure.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figures 1, 2:
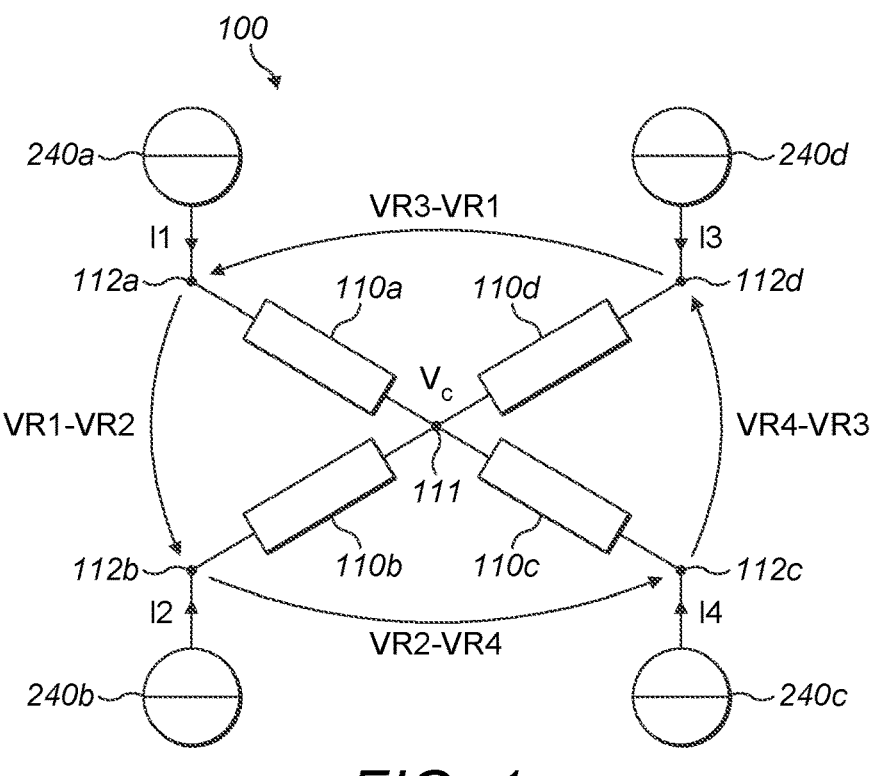
FIG. 1 shows a circuit diagram of a sensor device, comprising 4 sensing elements, in accordance with embodiments of the present invention.
FIG. 2 shows a circuit diagram of a sensor device, comprising 3 sensing elements, in accordance with embodiments of the present invention.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In a first aspect embodiments of the present invention relate to a sensor device 100 for measuring a physical parameter. The sensor device 100 comprises at least three sensing elements 110, wherein each of the sensing elements comprises a first node 111 and a second node 112. The first nodes 111 of all sensing elements are connected together, and the second nodes are accessible to a readout circuit for measuring differential signals between the second nodes.

Hence, in embodiments of the present invention the number of sensing elements is at least three, and the sensing elements share a common node.

At least three of the sensing elements 110 have a different sensitivity to the physical parameter.

Signal paths are present over two of the sensing elements 110 between the second nodes of the sensing elements. It is an advantage of embodiments of the present invention that faults in the sensor device can be determined by measuring a differential signal between the second nodes of a first signal path and the differential signal between the second nodes of a second signal path, and by comparing these differential signals. This is achieved by providing sensing elements with a sensitivity which is different (in magnitude and/or in sign) for at least three of the sensing elements. Thus, even if a sensing element which is common between two signal paths is failing, this will result in a change in sensitivity difference between the signal paths.

In embodiments of the present invention the difference in sensitivity between two sensing elements which have a different sensitivity may for example be at least 1%, or even 3%, or even 5%, or even 10% difference in sensitivity for 1 sensor element relative to the other sensor element.

It is an advantage of embodiments of the present invention that a failing sensing element results in a changing sensitivity difference between the signal paths.

In embodiments of the present invention the sensing elements may be resistive or capacitive sensors. For example resistive pressure sensing elements may be used. In embodiments of the present invention the sensing elements may for example be piezo-resistors. In the case of resistive sensing elements the sensitivity may be expressed in terms of the change of the resistivity for a change in physical parameter.

In an exemplary embodiment of the present invention the number of sensing elements 110 is exactly three. In such a solution only 4 connections with the sensor device are needed, while still generating redundant sensor signals to improve the functional safety integrity level. It is an advantage of embodiments of the present invention that a sensor device is obtained which has a minimum number of nodes and can provide sufficient redundancy for fulfilling functional safety requirements.

In an embodiment with exactly three sensing elements, two of the sensing elements may have an equal magnitude of the sensitivity but opposite sign.

In an embodiment with exactly three sensing elements, one of the sensing elements may have no sensitivity.

In an embodiment with exactly three sensing elements, two of the sensing elements may have an equal magnitude of the sensitivity but opposite sign, and one of the sensing elements may have no sensitivity.

In embodiments of the present invention additional sensors may be integrated in the sensor device while having a minimum number of nodes. The number of needed nodes is equal to the amount of sensing elements plus 1.

In embodiments of the present invention the number of sensing elements is exactly four. At least three of the four sensing elements should have a different sensitivity to the physical parameter. In some embodiments even all four sensing elements have a different sensitivity to the physical parameter.

In an embodiment with exactly four sensing elements, two of the sensing elements may have an equal magnitude of the sensitivity but opposite sign. The other two elements also may have the same magnitude and opposite sign, but the magnitude is different from the magnitude of the first 2.

In an embodiment with exactly four sensing elements, two of the sensing elements may have an equal magnitude of the sensitivity but opposite sign, while the two other ones are insensitive to the physical parameter.

In alternative embodiments of the present invention two of the sensing elements are not sensitive to the physical parameter. In that case two sensing elements are sensitive to the physical parameter and both with a different sensitivity. In such an embodiment the sensing elements which are not sensitive to the physical parameter may still be sensitive for package stress in the same way as the 2 other sensing elements. By subtracting the differential signal from the sensing elements which are sensitive to the package stress but not to the physical parameter from the differential signal from the sensing elements which are sensitive to the physical parameter (and to the package stress), the influence of the package stress on the obtained difference is reduced or even eliminated.

An example of the circuit of a sensor device in accordance with an exemplary embodiment of the present invention is shown in FIG. 1. The four sensing elements 110*a*, 110*b*, 110*c*, 110*d* are connected to one common node 111. Furthermore, the four sensing elements have second nodes 112*a*, 112*b*, 112*c*, and 112*d* connected to current sources 240*a*, 240*b*, 240*c*, and 240*d* providing currents I1, I2, I3, and I4 respectively. In the following the voltages of the second nodes 112*a*, 112*b*, 112*c*, and 112*d* are referred to as VR1, VR2, VR3, and VR4 respectively. The voltage of the common node 111 is referred to as Vc.

The common node 111 could be connected to ground, but it might also be biased differently. For MEMS (micro-electro-mechanical systems) based sensing elements there is typically also a need to connect the substrate. In that case it is advantageous to connect the common node to the substrate to avoid an extra connection. If the substrate is P-doped, then ground is a good choice as the substrate voltage should not be higher than any of the other voltages on the sensor. If the substrate is N-doped, then it is better to have the common sensor node connected to the highest potential, so that it can also be used to bias the substrate.

In the sensor device illustrated in FIG. 1 three independent voltages can be measured between the second nodes 112*a*, 112*b*, 112*c*, 112*d* and three differential voltages can be calculated from those measured voltages, including voltages VR3-VR2 and VR1-VR4.

In general, if there are N resistors connected to one first node 111, there are N-1 independent differential voltages.

Additionally, there is also 1 other independent differential voltage between the first node 111 and one of the second nodes 112.

In embodiments of the present invention the sensing elements are piezoresistors. The invention is, however, not limited thereto and also other sensing elements such as capacitive sensing elements can be used.

In embodiments of the present invention at least three of the sensing elements 110 have a different sensitivity to the physical parameter (e.g. pressure). This means that the magnitude and/or the sign of the sensitivity (e.g. caused by a change in resistance of the sensing element) are different.

There is a strong correlation between each of the 3 signals, because of their dependency on the same physical input. If the change in resistance for piezoresistors is considered to be linear, then only an offset and gain are needed to get the desired linear output curve. Typically the sensor is also temperature dependent and the offset and gain of each measured differential signal should be calibrated at multiple temperatures. In embodiments of the present invention the calibrated output curves can be used for detecting the correct functionality of the sensor.

In the following simplified example, the sensing elements are resistors which are pressure dependent. The resistance R1 of the first sensing element 110*a* is increasing X with pressure, the resistance R2 of the second sensing element 110*b* is decreasing X with pressure, the resistance R3 of the third sensing element is increasing X/2 with pressure and the resistance R4 of the fourth sensing element is decreasing X/2 with pressure. In this exemplary embodiment it is, for simplicity, assumed that the nominal resistance of the sensing elements is the same. It is, furthermore, assumed that the bias currents for biasing the sensing elements are the same. In the following this bias current is referred to as I. If the sensing device is connected with a readout circuit, the readout circuit may for example measure VR1-VR2 (changing 2*X*I), VR3-VR4 (X*I), VR1-VR4 (1.5*X*I). Therefore if the voltage changes between nodes 112*a* and 112*b* U volts, then the corresponding change between nodes 112*d* and 112*c* needs to be half of the change U, if the resistors function correctly. Similarly, the corresponding voltage change between nodes 112*a* and 112*c* should be ¾ times U.

FIG. 2 shows a circuit diagram of a sensing device 100, in accordance with embodiments of the present invention, which comprises only 3 sensing elements 110*a*, 110*b*, 110*c*. Similarly to FIG. 1, the three sensing elements have second nodes 112*a*, 112*b*, and 112*c* connected to current sources 240*a*, 240*b*, and 240*c* providing currents I1, I2, and I3 respectively, and the voltages of the second nodes 112*a*, 112*b*, and 112*c* are referred to as VR1, VR2, and VR3 respectively.

In the configuration of FIG. 2 only a minimum number of nodes of the sensing device are required. The common node 111 is shared between the sensing elements and is accessible for biasing this node. The second nodes 112*a*, 112*b*, and 112*c* are accessible by the readout circuit. In this example the readout circuit is not completely shown. Only current sources are shown which are connected to the second nodes of the sensing elements. The sensing elements may for example be sensor resistors. With three sensor resistors R1 (sensing element 110*a*), R2 (sensing element 110*b*), R3 (sensing element 110*c*) connected to a common node, three differential signals can be measured. In case, for example, the sensor resistors are biased with a current source, 3 differential voltages can be measured: VR1-VR2 can be measured between second nodes 112*a* (VR1) and 112*b* (VR2), VR1-VR3 can be measured between second nodes 112*a* (VR1) and 112*c* (VR3), and VR2-VR3 can be measured between second nodes 112*b* (VR2) and 112*c* (VR3). Note that the third measurement can be calculated from the other two measurements. In embodiments of the present invention the third measurement is used to find measurement errors. Remark that the negated voltages like VR2-VR1 are not considered as they basically measure the same signals.

In embodiments of the present invention each sensing element (e.g. resistor) has a different sensitivity to the sensed physical parameter. The difference in the sensitivity can be seen e.g. in the magnitude and/or sign. When each sensing element measures the same physical parameter value (e.g. pressure), there is correlation between e.g. the resistance values of the sensing elements. In embodiments of the present invention 2 of the 3 differential voltages are independent. There is a correlation between each of the 3 differential voltages, because they measure the same physical parameter. This correlation can be measured upfront, so that it is known. This can be achieved e.g. by measuring the differential voltages at 2 or more pressure values and fitting a curve to the measured voltages for each differential measurement. This way it is possible to calculate for every voltage a corresponding pressure. It can be made more accurate by applying offset, gain or other corrections for each differential voltage separately.

Since we know the pressure value corresponding to a differential voltage value for each differential voltage, it is straight-forward to obtain the correspondence between the differential voltages. Here the correspondence between the differential voltages of VR1-VR2 and VR1-VR3 is marked with C12_13, the correspondence between the differential voltages VR2-VR3 and VR1-VR3 with C13_23 and the correspondence between the differential voltages VR1-VR2 and VR2-VR3 with C12_23.

In that case any fault which is only influencing one of the three sensor resistors or one of the three (not-common) sensor nodes can be detected by comparing two differential measurement results with their known correspondence. When for example measuring VR1-VR2 and VR1-VR3, the equation $$VR1 - VR3 = C12\_13(VR1 - VR2) \text{ should hold.}$$

A mismatch versus the known correspondence means that a fault is present. The fault could be located at the sensing element (e.g. resistance drift, leakage current) or at the readout circuit (e.g. drift of bias current, leakage current).

Remark that in the exemplary embodiment where the sensing elements are resistors it is advantageous that all 3 resistors have nominally the same or a similar resistance value, to keep the signal small without pressure. Alternatively, in the case where the resistance values differ substantially between the resistors, their biasing currents can be made different in order to get nominally the same voltage over the sensor resistors. This ensures that the differential voltages remain small. For example in case 1 resistor has double the resistance value of the 2 others, then one could have half the bias current to get a similar voltage over this resistor as for the other 2 resistors.

In an exemplary embodiment of the present invention the resistance R1 of a first sensing element is increasing with pressure, the resistance R2 of a second sensing element is decreasing with pressure and the resistance R3 of a third sensing element is significantly less dependent (or totally not dependent) on pressure. The resistance R3 of the third sensing element can for example be made pressure independent by changing the position (e.g. aside of a membrane or at a position where longitudinal and transversal stress compensate each other) or the orientation. It can also be made significantly less sensitive by combining 2 or more resistor parts that react differently on pressure, e.g. a series (or parallel) connection of a resistor that increases with pressure and a resistor that decreases with pressure. To get nominally the same resistance, the first sensing element could be made by the series connection of 2 resistors that both increase with pressure and the second sensing element could be made by the series connection of 2 resistors that both decrease with pressure.

The errors may be quantized as follows. Suppose 3 resistors which are sensitive to physical parameter P, with sensitivities S1, S2 and S3, and which all have the same resistance R0 with P=0. Suppose all 3 resistors are biased with the same current I0 and suppose the first node of the 3 resistors is ground.

Then the following voltage is obtained at the second node of the different resistors:

$$VR1 = I0 * R0 * (1 + S1 * P)$$
$$VR2 = I0 * R0 * (1 + S2 * P)$$
$$VR3 = I0 * R0 * (1 + S3 * P)$$

In that case the differential voltages are:

$$VR13 = VR1 - VR3 = I0 * R0 * (S1 - S3) * P$$
$$VR23 = VR2 - VR3 = I0 * R0 * (S2 - S3) * P$$

These differential voltages may be calibrated using calibration factors G13 and G23:

$$Y13 = VR13 * G13$$
$$Y23 = VR23 * G23$$

The calibration is preferably such that:

$$Y13 = Y23 = Y0 \text{ (with } Y0 \text{ the ideal output)}$$

This requires that:

$$G13/G23 = (S2 - S3)/(S1 - S3)$$

The output error (e.g. in case of a fault at the sensor) is Y13-Y0 and Y23-Y0. To monitor if a fault is present, Y13-Y23 may be checked, which should ideally be 0. In the following different error cases are explained.

Error Case 1:
Suppose an offset error x is present for VR1. In that case:

$$Y13 = Y0 + x * G13$$
$$Y23 = Y0$$
$$Y13 - Y23 = x * G13$$

In that case the error is x*G13 and the output, which may be monitored for determining correct functionality of the sensor system, may be configured such that it outputs x*G13.

Error Case 2:
Suppose an offset error x is present for VR3. In that case:

$$Y13 = Y0 - x * G13$$
$$Y23 = Y0 - x * G23$$
$$Y13 - Y23 = x * (G23 - G13)$$

In that case the error is-x*G13 and −x*G23 and the output, which may be monitored for determining correct functionality of the sensor system, may be configured such that it outputs x*(G23-G13).

It is noted that if the difference between S1 and S2 is decreasing, then also the difference between G13 and G23 will be decreasing, so Y13-Y23 will be decreasing, and will be smaller than in error case 1. This case is therefore more difficult to detect, while the error is still in the same order as in case 1. Note that if S1=S2, then G13=G23 and Y13-Y23=0. In that case the error will not be detected, illustrating the need for different sensitivities.

If the sensitivity difference (S1-S2) becomes bigger, then also G23-G13 becomes bigger and the error will be easier detected.

In the simplified case of S3=0 and assuming small difference between S1 and S2, then s % difference in sensitivity between S1 and S2 would need approximately s % difference in gain between G23 and G13.

So if one has an error x=1%, then a sensitivity difference of 1% would only create a difference between Y13 and Y23 of approximately 0.01% of Y0 which is hardly detectable, while an error of 1% might not be acceptable.

If one has a sensitivity difference of 10%, then Y13-Y23 would be approximately 0.1% of Y0, which might be detectable.

So it would be advantageous to have sensitivity differences of 10%, 20% or even more. One could also live with for example 5% or less at the expense of reduced sensitivity for the error detection (monitor).

In the optimal scenario S2=−S1, so also G13=−G23. In that case the monitor output is twice the error magnitude, so easily detectable.

Error Case 3:
Suppose a sensitivity error x at S1. In that case:

$$VR1 = I0 * R0 * (1 + (S1 + x) * P)$$
$$VR13 = VR1 - VR3 = I0 * R0 * (S1 + x - S3) * P$$
$$Y13 = Y0 + I0 * R0 * x * P * G13$$
$$Y23 = Y0$$
$$Y13 - Y23 = I0 * R0 * x * P * G13$$

In that case the error is I0*R0*x*P*G13 and the output, which may be monitored for determining correct functionality of the sensor system, may be configured such that it outputs I0*R0***P*G13.

For P=0, this will result in Y13−Y23=0. In that case the S1 error will not detected by monitoring I0*R0*x*P*G13, but the sensitivity error also does not cause an error for Y13 at P=0.

For P different from 0, also Y13-Y23 will be different from zero, and therefore potentially detectable.
Error Case 4:
Suppose a sensitivity error x is present for S3:

$$VR13 = VR1 - VR3 = I0*R0*(S1-S3-x)*P$$
$$VR23 = VR2 - VR3 = I0*R0*(S2-S3-x)*P$$

If in this case S1=S2, then Y13–Y23=0 and the error will not be detected. So also the detection of sensitivity errors requires a difference in the sensor sensitivity.

Also other error sources which impact only 1 sensor element, 1 (second) sensor node or 1 differential output reading are better detectable with different sensitivities of the sensor elements. Even some errors which impact multiple sensor elements, sensor nodes or differential output readings may benefit from sensor elements with different sensitivities.

In a second aspect embodiments of the present invention relate to a sensor system 300. The sensor system comprises a sensor device 100 and a readout circuit 200. The readout circuit 200 is connected to the second node 112 of each sensing element and is configured for applying driving signals to the second nodes and for reading differential signals between pairs of the second nodes 112.

The readout circuit 200 may for example comprise one or more current sources for injecting a current through the sensing elements 110 or one or more voltage sources for applying a bias over the sensing elements 110. The readout circuit 200 may comprise switches for connecting the one or more current source(s) or voltage source(s) to one or more of the node(s).

The readout circuit may also comprise at least one signal path for processing the differential signals between the second nodes. A signal path may be present for each node pair, or a signal path may be multiplexed between the different node pairs. In some embodiments of the present invention hybrid cases may exist wherein the readout circuit comprises two signal paths. One fixed to one pair of second nodes, and the other multiplexed between all other pairs of second nodes. Thus, a compromise is obtained between cost and safety.

In embodiments of the present invention the differential signals are differential voltages.

In embodiments of the present invention the at least one signal path comprises an amplifier. Thus, the differential signal between the second nodes can be amplified. In some embodiments of the present invention an amplifier is not strictly required. In some cases the sensor device may be directly connected to an ADC without amplification of the differential signal.

The readout circuit 200 is, furthermore, configured for comparing the differential signals, after calibrating the differential signals taking into account the sensitivities of the sensing elements, for determining correct functionality of the sensor system 300. It is thereby an advantage of embodiments of the present invention that a redundant system is obtained with only a limited number of nodes of the sensing element. The readout circuit may comprise an ADC for converting an analog differential signal into a digital signal. The readout circuit may furthermore comprise a processing device (e.g. microprocessor, digital signal processor, field programmable gate array) for processing the digital signal. This processing comprises comparing the differential signals, after calibrating the differential signals taking into account the sensitivities of the sensing elements, for determining correct functionality of the sensor system. In embodiments of the present invention, after calibration the obtained calibrated differential signals are substantially the same, unless an error occurred in the sensor system 300.

In embodiments of the present invention the readout circuit 200 may be configured for applying a predefined voltage to the first node 111 as driving signal to the first node. In alternative embodiments the predefined voltage (e.g. ground) may be applied to the first node directly via a PCB on which the sensor device is mounted.

In embodiments of the present invention the readout circuit 200 may also be connected with the first node 111. This can for example be advantageous when the sensing elements are piczoresistors. Piezo-resistors are typically not only stress (pressure) dependent, but also temperature dependent. In that case the average voltage between the first node and the second node of a sensing element is a measure for the temperature.

Figure 3:
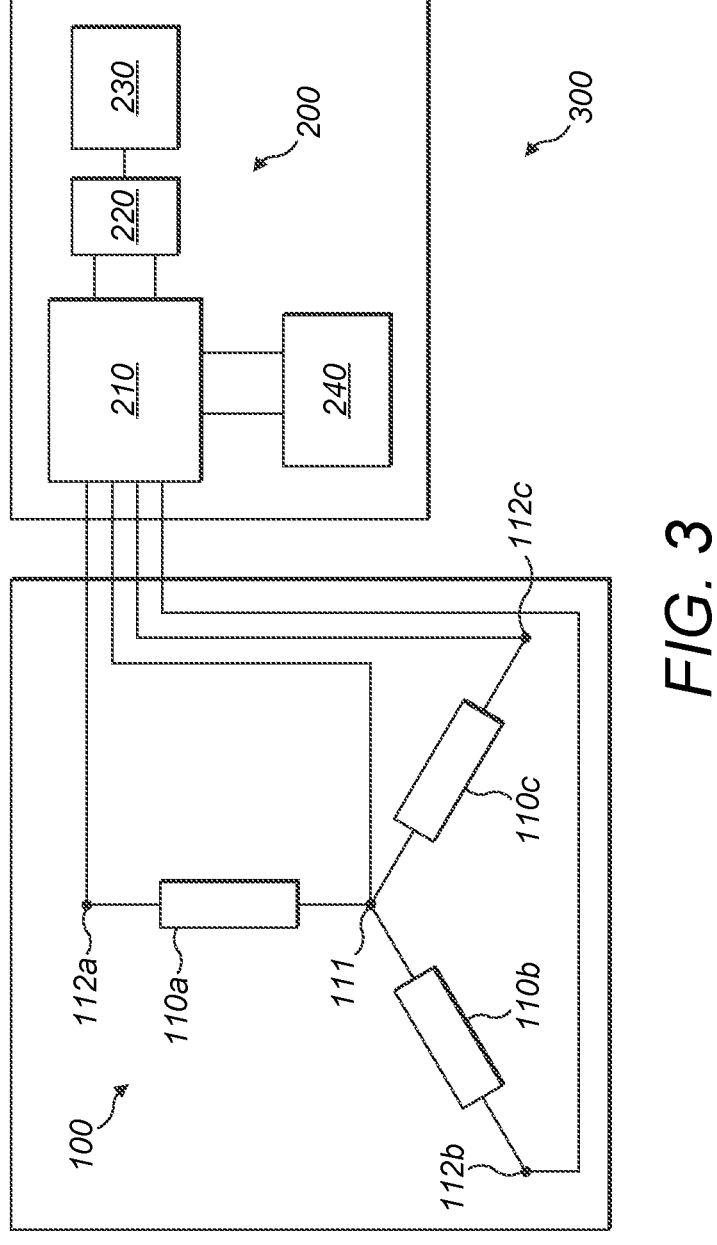
FIG. 3 shows a circuit diagram of a sensor system, comprising a sensor device and a readout circuit, in accordance with embodiments of the present invention.

FIG. 3 shows a schematic diagram of an exemplary sensor system 300, comprising a sensor device 100 and readout circuit 200, in accordance with embodiments of the present invention. In FIG. 3, the sensor device 100 and the readout circuit 200 are separate devices. The sensor device 100 comprises at least three sensing elements 110 in accordance with embodiments of the present invention. The sensor device may for example be a MEMS pressure sensor or any other type of sensor device comprising 3 sensing elements connected together to a common node and wherein at least three sensing elements have a different sensitivity to the physical parameter.

The readout circuit 200 comprises a control block 210 which comprises switches which enable the connection of any of the nodes of the sensor to an amplifier 220 and after that to an ADC and signal processing block 230, which may be connected to outside control, or it may perform the required calculations relating to sensor output and functional safety inside the sensor system 300.

The control block 210 may be configured for detecting if one of the sensing element branches is faulty and identifying it in the signal processing block 230. In case there are e.g. 4 sensing elements, the sensor system 200 may continue to be functional using the three remaining sensing elements 110.

In the exemplary embodiment illustrated in FIG. 3 the readout circuit 200 further comprises current sources 240 which are feeding the required current to the second nodes of the sensing elements 110, here shown as resistors. The control block 210 connects these currents to corresponding nodes for the measurement.

In embodiments of the present invention the number of current sources may be smaller than the number of second nodes because the control block can select to which second node each current source is connected.

As explained before, with N resistors as sensing elements N-1 independent differential voltages can be measured. In some embodiments of the present invention also the $N^{th}$ differential voltage is measured. This differential voltage can also be calculated from the other N-1 differential voltages. If only one sensing element is faulty, then it can be determined which one is faulty and continue measuring using only valid measurements. In embodiments of the present invention the readout circuitry is configured for determining which sensing element is faulty when one sensing element of the sensor device is failing. This can be done for a sensing device with at least 4 sensing elements. In an embodiment with 4 sensing elements as illustrated in FIG. 1 this can be achieved by comparing the differential signals after calibrating the differential signals taking into account the sensitivities of the sensing elements. When one sensing element is failing two of the calibrated differential signals are equal while two other calibrated differential signals are different from each other. The calibrated differential signals which are equal are the correct ones. Note that with 3 resistors it is not directly possible to determine which measurement is correct, unless differential signals are measured for each sensing element separately.

Figure 4:
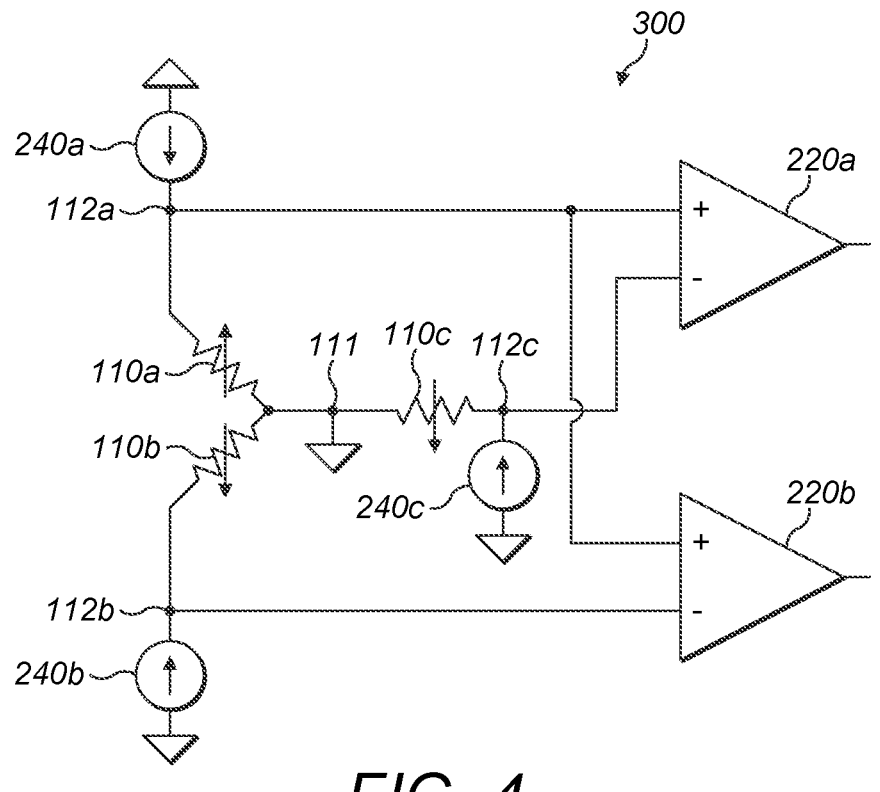
FIG. 4 shows a circuit diagram of a sensor system comprising current sources and amplifiers, in accordance with embodiments of the present invention.

FIG. 4 shows a schematic drawing of a sensor system 300 in accordance with embodiments of the present invention. In the example three branches extend from a first node 111. Each of these branches comprises a sensing element 110a, 110b, 110c. In the example the sensing elements are variable resistances of which the resistance value is dependent on the physical parameter to be measured. They may for example be piezoresistors on a membrane for which the resistance of the piezoresistors changes upon deflection of the membrane. The arrows in the resistors indicate the direction of the change in resistance, i.e. for resistor 110a the resistance increases and for resistors 110b and 110c the resistance decreases as the pressure on the membrane increases. Thus, pressure dependent electrical signals can be measured. In the example the first node 111 is connected to ground. Two different signals are measured: one measures the differential signal between first nodes 112a and 112b, and the other measures the differential signal between nodes 112a and 112c. There is also another differential signal that can be measured (between nodes 112b and 112c), but this signal is less sensitive to pressure variations than the other two signals and is not required to detect sensor faults. The current sources 240a, 240b, 240c are connected with the first nodes 112a, 112b, 112c for injecting current in the sensing elements. The differential signals are amplified using amplifiers 220a and 220b.

Figure 5:
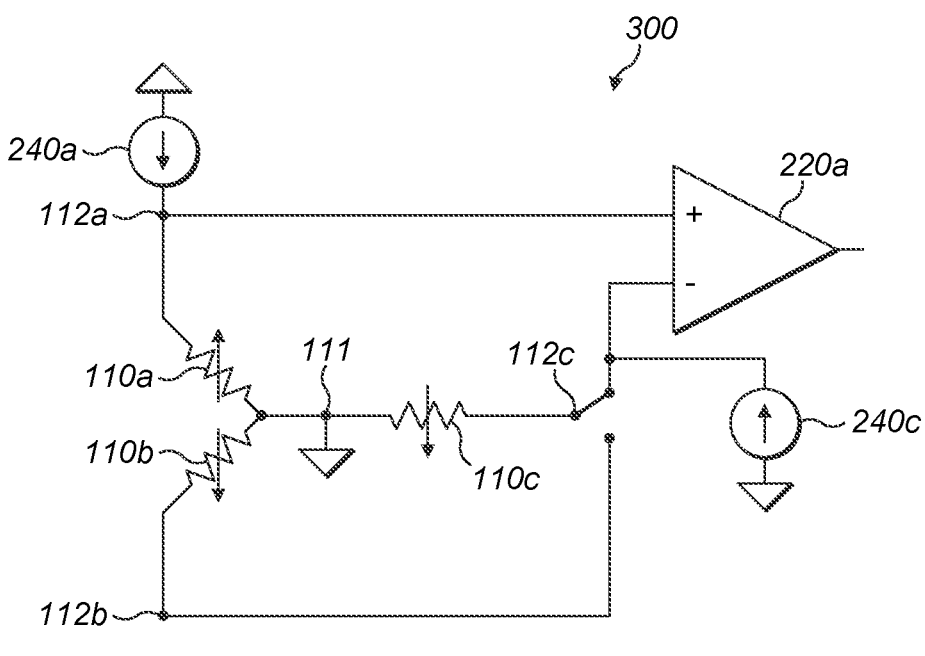
FIG. 5 shows a circuit diagram of a sensor system comprising a switch for switching between second nodes of two sensing elements, in accordance with embodiments of the present invention.

In an alternative embodiment the number of current sources 240 and amplifiers 220 may be reduced by sequentially reading out the differential signals. A possible implementation is shown in FIG. 5. A switch is provided which is on one side connected with two of the second nodes 112b, 112c of the sensing elements 110 and on the other side with an input of the amplifier 220 and with a current source 240c. The switch allows for switching between second node 112b and second node 112c to compare different signals with second node 112a. At the input of the amplifier 220 either the differential signal between second nodes 112a, 112b is present or the differential signal between second nodes 112a, 112c. Two current sources 240a, 240c are provided to provide a current through the resistances 110a, 110b, 110c. It is an advantage of such a sensor device in accordance with embodiments of the present invention that two signal paths can be compare while only needing four pins to provide input and output signals.

In the exemplary embodiments cited above the sensing elements were resistors. The invention is, however, not limited thereto. Also other sensing elements such as capacitive sensors may be used. Instead of using a fixed current source as illustrated in FIG. 1 and FIG. 2, one can enable the current source only for a short time (e.g. 1 microsecond) and measure the voltage directly afterwards. This can be repeated after all capacitors are discharged again. The invention is, however, not limited to this readout circuit implementation. Also other implementations are possible.

Figure 6:
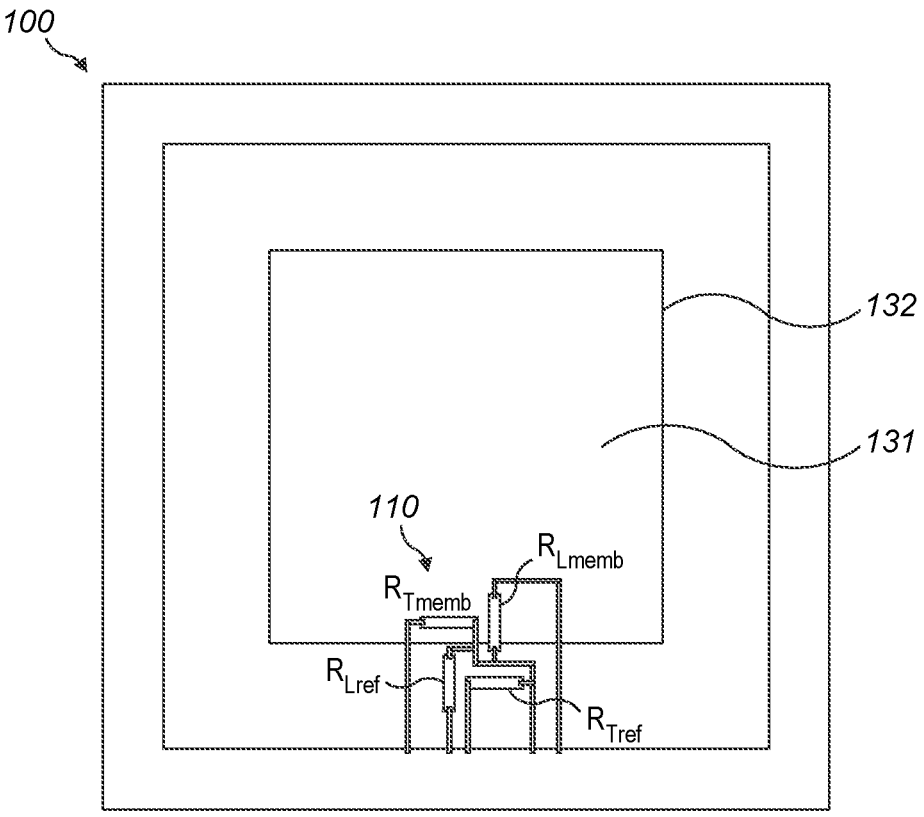
FIG. 6 shows a common node layout comprising sensing resistors and compensating resistors in accordance with embodiments of the present invention.

FIG. 6 shows a common node layout comprising sensing resistors and compensating resistors in accordance with embodiments of the present invention. The sensor device 100 is a semiconductor pressure sensor comprising a membrane 131, delineated by an edge 132.

The sensing elements 110 are neighboring piezo resistors, wherein a first $R_{Tmemb}$ and a second piezo resistor $R_{Lmemb}$ are positioned near the edge 132 of the membrane 131 such that center points are located on the membrane 131.

The third $R_{Tref}$ and fourth piezo resistor $R_{Lref}$ (also referred to as compensating resistors) are at a position where applied pressure causes reduced surface stress compared to surface stress at the position of the first and the second piezo resistor.

The first and the third piezo resistor $R_{Tmemb}$ and $R_{Tref}$ are substantially orthogonal to the second and the fourth piezo resistor $R_{Lmemb}$ and $R_{Lref}$.

The third $R_{Tref}$ and fourth piezo resistor $R_{Lref}$ may be positioned at least partially outside the membrane, or they may be at leas partially positioned in a zero stress zone of the membrane.

It is an advantage of embodiments of the present invention that disturbances which change irregularly (e.g. nonlinearly) over the semiconductor pressure sensor and result in a disturbance in the pressure measurement of the first ($R_{Tmemb}$) and the second ($R_{Lmemb}$) piezo-resistor can be compensated for by the third ($R_{Tref}$) and the fourth piezo-resistor ($R_{Lref}$). This is achieved by positioning the piezo-resistors as a group of neighboring piezo-resistors of which two are at least partially on the membrane and two are at least partially outside the membrane or at least partially on a zero stress zone of the membrane. The latter two are not or less sensitive to the pressure but are sensitive to the same disturbances as the piezo-resistors on the membrane which are sensitive to the pressure. The third and fourth piezo resistors may for example be positioned such that they are 50% less sensitive, or even 70% less sensitive, or even 90% less sensitive, or even 95% less sensitive for applied pressure than the first and second piezo resistors near the edge of the membrane.

Where in embodiments of the present invention reference is made to a zero stress zone of the membrane, reference is made to a zone where the stress does not significantly change with differential pressure between the top and bottom side of the membrane. The piezo resistors which are positioned at least partially in the zero stress zone are not or less sensitive to the differential pressure compared to the piezo-resistors at the side of the membrane.

The neighboring piezo resistors may for example be present in a section between two lines going through the center of the membrane and having an angle of 90° between them. In such embodiments the neighboring piezo resistors are present in a quarter of the membrane. In some embodiments the angle may be smaller than 170°, or even smaller than 160°, or even smaller than 150°, or even smaller than 140°, or even smaller than 130°, or even smaller than 120°, or even smaller than 110°, or even smaller than 100°, or even smaller than 90°, or even smaller than 80°, or even smaller than 70°, or even smaller than 60°, or even smaller than 50°, or even smaller than 40°.

In embodiments of the present invention the sensor system comprises such a sensor device comprising the neighboring piezo resistors. The sensor system is, moreover, configured such that a signal from the first piezo resistor $R_{Tmemb}$ and a signal from the second piezo resistor $R_{Lmemb}$, corrected with a signal from the third piezo resistor $R_{Tref}$ and a signal from the fourth piezo resistor $R_{Lref}$, are used as a measure of a pressure on the membrane.

Figure 7:
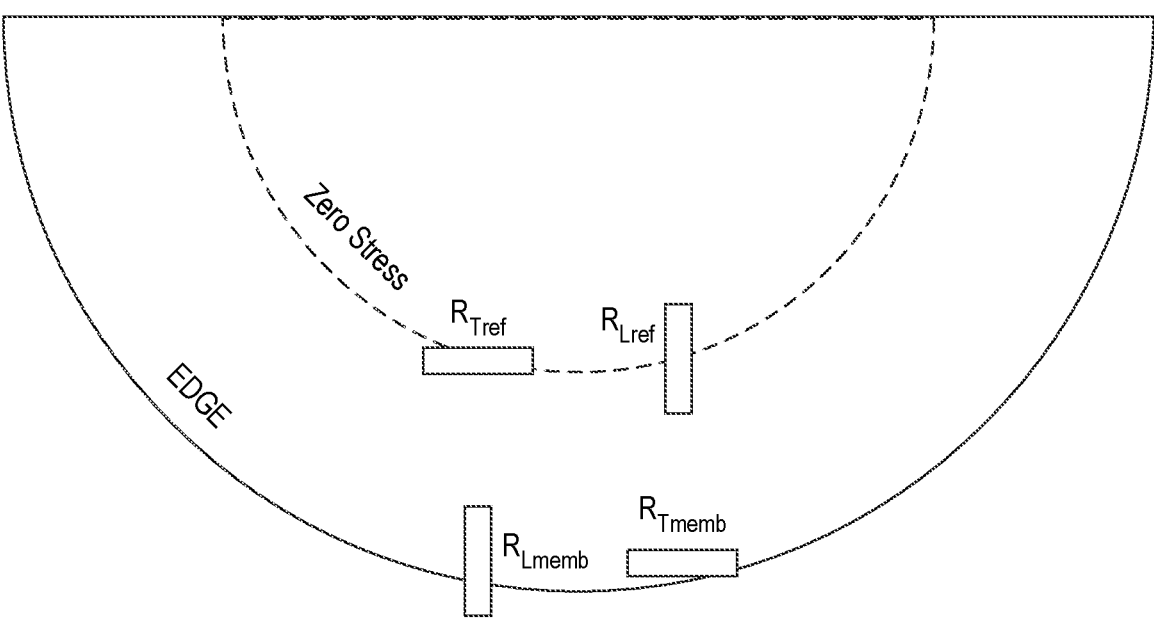
FIG. 7 shows half of a circular membrane and half of a square membrane comprising sensing piezo resistors and compensating piezo resistors in a point symmetric configuration wherein the compensating piezo resistors are at least partly located on a zero stress zone of the membrane, in accordance with embodiments of the present invention.
Figure 7:
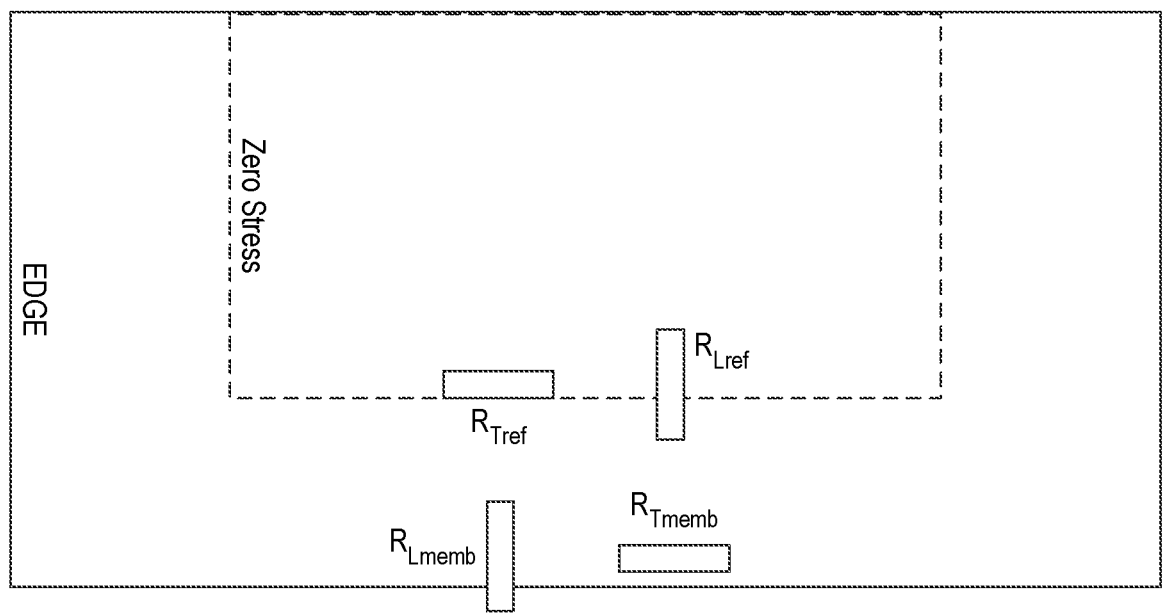

An exemplary embodiment where the piezo resistors are positioned on a circular membrane is shown in the top drawing of FIG. 7 and on a square membrane is shown in the bottom drawing of FIG. 7. Also these resistors can be connected in a common node configuration in accordance with embodiments of the present invention. For both examples only the lower half of the membrane is depicted. The size of the membrane in this example was 1000 μm. This is considered a large membrane. It is understood that the membrane may also have different sizes. The compensating piezo resistors are in both designs at least partially positioned on a zero stress zone and the sensing piezo resistors are positioned on the membrane at a side of the membrane. The compensation and the sensing piezo-resistors are positioned in a point symmetric combination.

The invention claimed is:

1. A sensor device for measuring a physical parameter, the sensor device comprising at least three sensing elements each sensing element comprising a first node and a second node, wherein the first nodes of all sensing elements are connected together, and wherein the second nodes are accessible to a readout circuit for measuring differential signals between the second nodes, and wherein at least three of the sensing elements have a different sensitivity to the physical parameter.

2. The sensor device according to claim 1 wherein the number of sensing elements is exactly four.

3. The sensor device according to claim 1 wherein all sensing elements have a different sensitivity to the physical parameter.

4. The sensor device according to claim 2 wherein two of the sensing elements are not sensitive to the physical parameter.

5. The sensor device according to claim 1 wherein the sensing elements are sensing resistors.

6. The sensor device according to claim 5 wherein the resistance of at least one of the sensing resistors is increasing with increasing physical parameter and wherein the resistance of at least one of the sensing resistors is decreasing with increasing physical parameter, thus forming a pair of sensing resistors with sensitivities with opposite sign.

7. The sensor device according to claim 6 wherein the sensing resistors of the pair of sensing resistors with sensitivities with opposite sign have nominally the same value.

8. The sensor device according to claim 1 wherein the sensing elements are capacitive sensors.

9. The sensor device according to claim 1, wherein the sensor device is a semiconductor pressure sensor comprising a membrane, delineated by an edge, and wherein the sensing elements are neighboring piezo resistors, wherein a first ($R_{Tmemb}$) and a second piezo resistor ($R_{Lmemb}$) are positioned near the edge of the membrane such that center points are located on the membrane, and wherein a third ($R_{Tref}$) and a fourth piezo resistor ($R_{Lref}$) are at a position where applied pressure causes reduced surface stress compared to surface stress at the position of the first and the second piezo resistor, and wherein the first and the third piezo resistor ($R_{Tmemb}$ and $R_{Tref}$) are substantially orthogonal to the second and the fourth piezo resistor ($R_{Lmemb}$ and $R_{Lref}$).

10. A sensor system comprising a sensor device according to claim 1, and a readout circuit connected to the second node of each sensing element wherein the readout circuit is configured for applying driving signals to the second nodes, and for
reading differential signals between different pairs of the second nodes, and for
calibrating the differential signals taking into account the sensitivities of the sensing elements, and comparing the calibrated differential signals for determining correct functionality of the sensor system.

11. The sensor system according to claim 10 wherein the readout circuit comprises at least two current sources for injecting a current in the sensing elements as driving signal.

12. The sensor system according to claim 10 wherein the differential signals are differential voltages.

13. The sensor system according to claim 10, the readout circuitry comprising at least one signal path for processing the differential signals, wherein the at least one signal path comprises an amplifier.

14. The sensor system according to claim 10, wherein the number of sensing elements is at least 4, and wherein the readout circuit is configured for determining which differential signals are correct, by comparing the calibrated differential signals.

15. The sensor device according to claim 1 wherein the number of sensing elements is exactly three.

\* \* \* \* \*